No. 656,786. Patented Aug. 28, 1900.
F. V. GIFFORD.
MILK PASTEURIZING APPARATUS.
(Application filed Sept. 11, 1899.)
(No Model.) 2 Sheets—Sheet 1.
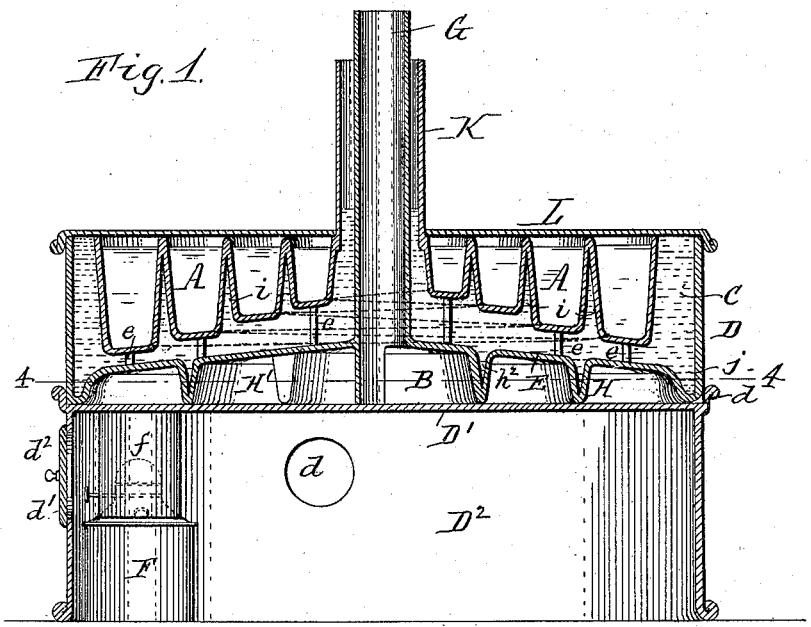
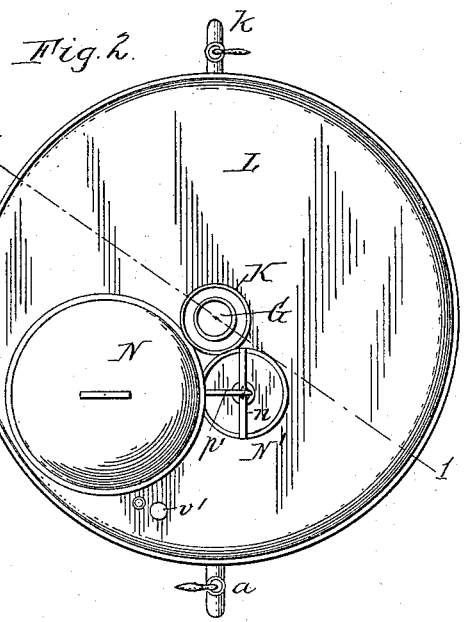
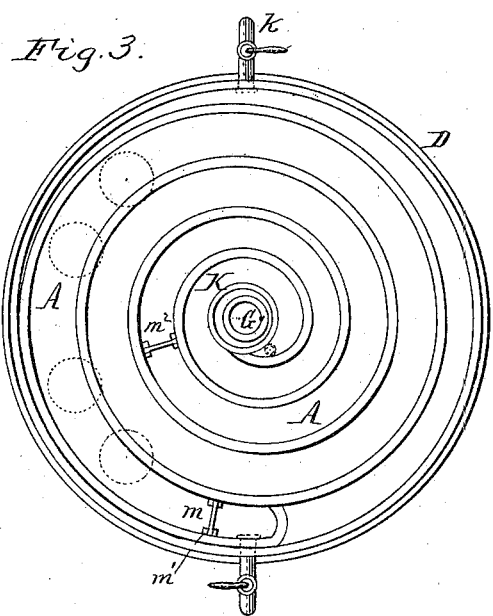
Witnesses:
E. A. Volk.
F. F. Scherzinger
Frank V. Gifford, Inventor.
By Wilhelm Bonner
Attorneys.

No. 656,786. Patented Aug. 28, 1900.
F. V. GIFFORD.
MILK PASTEURIZING APPARATUS.
(Application filed Sept. 11, 1899.)
(No Model.) 2 Sheets—Sheet 2.
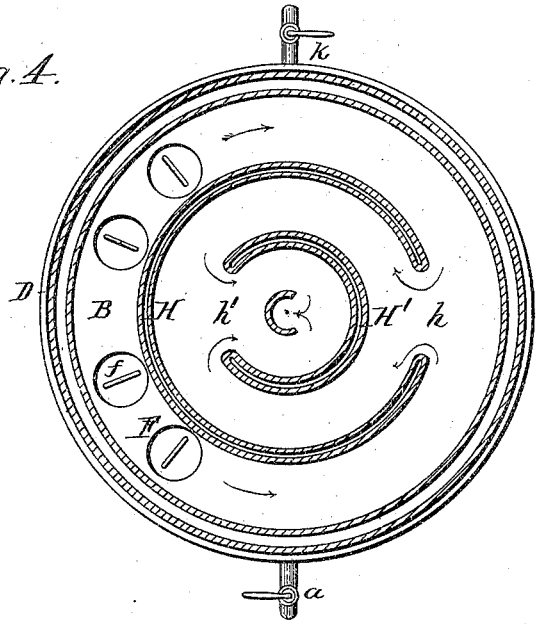
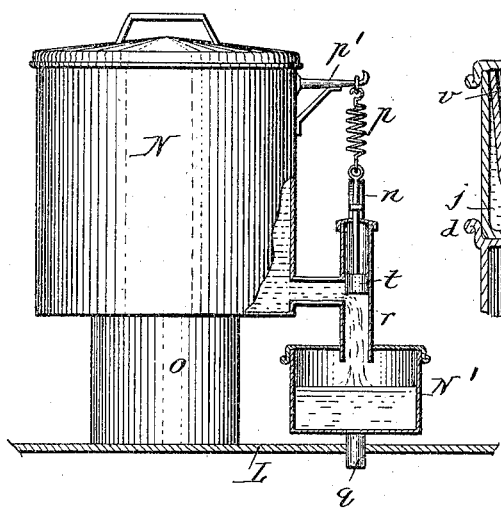
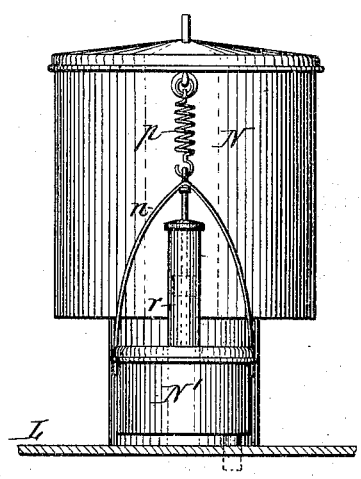
Witnesses:
E. A. Volk
Henry L. Deck
Frank V. Gifford Inventor
By Wilhelm Bonnet
Attorneys.

United States Patent Office.

FRANK V. GIFFORD, OF NIAGARA FALLS, NEW YORK.

MILK-PASTEURIZING APPARATUS.

SPECIFICATION forming part of Letters Patent No. 656,786, dated August 28, 1900.

Application filed September 11, 1899. Serial No. 730,067. (No model.)

*To all whom it may concern:*

Be it known that I, FRANK V. GIFFORD, a citizen of the United States, residing at Niagara Falls, in the county of Niagara and State of New York, have invented new and useful Improvements in Milk-Pasteurizing Apparatus, of which the following is a specification.

This invention relates to an apparatus for sterilizing or pasteurizing milk.

One of the objects of my invention is the construction of a compact apparatus of this kind which is free from cavities in which impurities are liable to lodge and which is easily accessible for cleaning purposes.

Another object of the invention is to provide an efficient apparatus in which all portions of the milk are subjected to a uniform moist heat to prevent scumming of the same and in which the temperature of the milk is gradually raised to the necessary degree to destroy all disease-breeding germs, so as to obviate curdling or souring of the milk, which is liable to occur when the same is subjected to sudden changes of temperature.

In the accompanying drawings, consisting of two sheets, Figure 1 is a vertical section of my improved apparatus in line 1 1, Fig. 2. Fig. 2 is a top plan view of the same. Fig. 3 is a top plan view thereof with the cover removed. Fig. 4 is a horizontal section in line 4 4, Fig. 1, on a reduced scale. Fig. 5 is an enlarged side elevation, partly in section, of the supply-tanks of the apparatus. Fig. 6 is a front elevation of said tanks. Fig. 7 is a fragmentary vertical section of the apparatus, showing the dam located near the discharge end of the spiral milk-trough.

Like letters of reference refer to like parts in the several figures.

The pan or vat in which the milk is sterilized consists of a spiral trough, channel, or passage A, which is open at its top and closed at its bottom and sides. This channel receives the milk at its inner or central portion and discharges the same at its peripheral or outer end, where it is provided with a delivery-cock $a$. In order to cause the milk to flow slowly toward the discharge end of the trough, the bottom of the trough is uniformly and gently inclined from its inner to its outer end.

B is a horizontal heating-chamber arranged below the spiral trough A, and C is a water chamber or bath interposed between the heating-chamber and the bottom of the milk-trough for preventing scorching of the milk. The milk-trough is inclosed by a cylindrical casing D, which preferably rests loosely on a metallic horizontal plate D', which forms the bottom of the heating-chamber B. This plate is supported on an upright cylindrical base $D^2$ and in turn supports the superposed parts of the apparatus. The bottom plate D' is provided with an upwardly-projecting rim $d$, into which the casing D fits snugly, as shown in Fig. 1. The casing D is provided at a short distance below the bottom of the milk-trough with a metallic diaphragm or bottom E, which forms the bottom of the water-chamber C and the top of the heating-chamber B. The trough A is supported above the diaphragm E by blocks $e$ or other suitable means. As shown, the casing D forms the upright walls of the water and heating chambers. The chamber B may be heated by any suitable means; but I prefer to employ one or more oil-lamps F of any ordinary construction, the chimneys $f$ of which are fitted in or pass through openings formed in the bottom of the heating-chamber, as shown in Fig. 4. The closed base $D^2$ is provided with one or more draft-openings $d$ and with hand-holes $d'$, closed by doors $d^2$, through which access is had to the heaters F for lighting the same.

G is an upright chimney or exit-flue which extends upwardly from the central portion of the heating-chamber B and through which the products of combustion escape. This chimney opens into the heating-chamber and extends upwardly through the central portion of the milk-trough and rises to a suitable height above the trough, as shown. The heating-chamber is preferably provided with internal segmental partitions or baffle-plates H H', which prevent the products of combustion from passing directly to the chimney and compel the same to circulate around the entire chamber before leaving the same, thereby retarding their escape and heating all portions of the superposed water-chamber C. For this purpose the partitions H H' are preferably concentric with each other, and the opening $h$ of the outer partition is located on the side of the heating-chamber opposite that at which the heaters F are arranged, while the opening $h'$ of the inner partition H' is arranged to face the side of the chamber at which the heaters are located.

In order to heat the milk gradually in its passage from the inlet to the discharge end of the spiral trough A, the heaters F are placed directly under the final or discharge portion of the trough, as shown by dotted lines in Fig. 3 and by full lines in Fig. 4, so that the temperature is lowest under the inlet end of the trough and gradually increases toward the discharge end thereof, thus avoiding sudden heating of the milk from the lowest to the highest temperature, which would be liable to cause curdling or souring of the milk.

The spiral wall which forms the milk-trough A is preferably hollow, as shown at $i$, and its upper end is closed, while its lower end opens into the water-chamber C, so that the hot water in said chamber is allowed to rise into the hollow walls of the trough, thereby heating not only the bottom of the channel, but also its sides, and effecting a quicker and more thorough and uniform heating of the milk.

In order to effectually utilize the heat in the chamber B, the partitions or baffle-walls H H' are made hollow and open at their upper ends into the water-chamber C, as shown at $h^2$ in Fig. 1, so that the water fills the hollow partitions and becomes heated by contact therewith. For the same purpose the lower portion of the wall of the casing D is made double or hollow, as shown at $j$ in Figs. 1 and 7, so that the water is exposed to the heated outer walls of the heating-chamber B.

The outermost convolution of the spiral trough A is preferably tapered downwardly, so as to increase the water-space between the same and the surrounding casing D, as shown in Fig. 1. The chamber C is supplied with water through a central feed-pipe K, which extends upwardly from an opening in the bottom of the milk-trough, and surrounds the chimney G, as shown in Figs. 1, 2, and 3. The chimney is sufficiently smaller than the feed-pipe to leave an intervening water-space between the pipes. This feed-pipe is filled to a level above the top of the milk-trough, so that the hollow walls of the trough always remain filled with water. The water-chamber is provided with a valve $k$ for draining off its contents from time to time. In order to render the outline of the spiral milk-trough as nearly circular as practicable, the walls of the trough are tapered laterally toward both ends, as shown in Fig. 3, and for the purpose of preventing undue narrowing of the extreme inner portion of the trough the feed-pipe K is offset or arranged eccentrically around the central chimney G, as shown.

L is a tight removable cover which is applied to the open upper end of the milk-trough for excluding the atmosphere from the milk while pasteurizing the same. This cover has a central opening for the passage of the feed-pipe K and the chimney G.

$m$ is an upright wall or dam arranged across the discharge portion of the spiral milk-trough A on the inner side of the discharge-faucet $a$. This dam extends nearly to the top of the trough and allows only the hot upper or surface layer of milk, which overflows the dam, to escape from the trough, thereby detaining the milk in the trough until the same is heated to the desired temperature. The dam is removably arranged in upright ways $m'$, secured to the walls of the trough, so that the same can be withdrawn for discharging the final portion of the milk supplied to the trough. An additional removable dam $m^2$ is preferably arranged in the trough—say in its second turn from the center, as shown. This dam should be somewhat lower than the dam $m$ near the outlet of the trough.

The milk to be heated may be supplied to the trough A directly from a comparatively-large tank N; but it is desirable to supply the milk under a small head or pressure, in order to prevent agitation and too rapid a flow of the milk through the trough. For this purpose I prefer to employ an auxiliary or supplemental supply-tank $n'$, which is supplied from the main tank N and delivers its contents into the inner end of the trough A and a cut-off or governing device which automatically maintains the desired predetermined small quantity of milk in the auxiliary tank. The main tank is supported above the level of the auxiliary tank by a platform or pedestal $o$, which rests upon the cover L. The auxiliary tank is connected with or carried by a counterbalancing device, such as a spring $p$, so that said tank is yieldingly supported and allowed to descend under the wight of the milk entering the same and is elevated by the spring as the tank becomes lighter by the discharge of the milk. The spring $p$ is attached at its upper end to a bracket $p'$, secured to the main tank N, and the auxiliary tank is suspended from the spring $p$ by means of a rigid handle or bail $n$. The auxiliary tank is provided in its bottom with a depending discharge-spout $q$, which slides vertically in an opening formed in the cover L and is arranged directly above the inlet end of the trough A, as shown by dotted lines in Fig. 3.

$r$ is the discharge-spout of the main tank N, which passes loosely through an opening formed in the cover of the auxiliary tank, as most clearly shown in Figs. 5 and 6, so that this tank is free to rise and fall with reference to said spout. In the vertical portion of the spout $r$ is arranged a sliding valve $t$, which controls the flow of the milk through the spout. The stem of this valve is connected with the rigid handle or bail $n$ of the auxiliary tank, whereby the valve is opened and closed by the vertical movements of said tank. When the auxiliary tank N' descends under the increasing weight of the incoming milk, the valve $t$ is gradually and automatically closed until the proper predetermined quantity of milk has been supplied to said tank, when the further supply thereto is shut off. As the auxiliary tank becomes lighter by the discharge of the milk therefrom it is elevated by the reaction of its counterbalancing-spring $p$, thereby causing the valve $t$ to be opened and allowing the milk to flow from the main into the auxiliary tank until the latter is again supplied to the normal level, when the supply is again shut off. The auxiliary tank in conjunction with the cut-off valve $t$, thus acts as a governor which keeps the milk at the desired low level in the auxiliary tank.

$v$ is a thermometer depending from the cover of the spiral trough into the milk in the latter at a point near the dam $m$, and $v'$ is a window through which the level of the liquid in the trough can be observed.

In the use of the apparatus water is supplied to the chamber C, and its temperature is raised to the proper degree by the heaters F. The milk entering the central or inlet portion of the inclined trough A flows slowly through the several windings of the trough and is uniformly heated by contact with the bottom and the hollow side walls of the trough, its temperature being gradually raised as it approaches the discharge end of the trough, so that by the time it reaches the discharge-valve $a$ of the trough it is heated to the proper point to insure the destruction of all disease-germs contained in the same, while curdling or souring of the milk is prevented by the graduation of the heat from the inlet toward the outlet end of the trough. The heating of the milk to the required high temperature causes steam to be generated in the trough above the surface of the milk, and this steam furnishes the necessary moisture to prevent the formation of scum on the milk. It will be observed that the milk is exposed to a heating medium at its top, bottom, and sides, and it can therefore be heated to the desired temperature in a comparatively-short space of time and with an economical use of heat. By extending the chimney G through the water-feeding pipe K the water is also heated by this chimney.

The bent or spiral form of the milk-trough while providing a comparatively-long course for the milk within a small compass has no cavities or pockets in which impurities are liable to lodge, but presents only flat and curved surfaces which are easy of access and can be thoroughly and quickly cleaned. By making the spiral trough A and the bottom plate D' separate from the casing D these parts can be readily taken apart to facilitate the cleaning of the apparatus.

I claim as my invention—

1. The combination with a bottom plate, of a casing resting loosely on said bottom plate and provided near its lower end with a diaphragm, the space between said bottom plate and said diaphragm forming a heating-chamber, a milk-vat supported in said casing and having its bottom arranged at a distance from said diaphragm to form an intervening water-chamber, and a removable cover applied to the top of said vat and casing, substantially as set forth.

2. The combination with a heating-chamber and a milk trough or vat arranged above the same, of a water-chamber interposed between said heating-chamber and said trough and having a central feed-pipe which extends above said vat, and an upright chimney extending upwardly from said heating-chamber through said feed-pipe and separated from the latter by an intervening water-space, substantially as set forth.

3. The combination with a bent or spiral milk-trough having an inlet and an outlet at opposite ends thereof, of a heating-chamber arranged underneath said trough, and a heater applied to the portion of said heating-chamber arranged under the outlet portion of said trough, substantially as set forth.

4. The combination with a main supply-tank having a laterally-projecting discharge-pipe provided with a vertical spout which extends above and below said pipe, of a piston-valve sliding in said vertical spout, adapted to cover or uncover the outer end of said pipe, and provided with an upwardly-extending stem, a vertically-movable tank arranged under the discharge-spout of the main tank and having a bail which is connected with the stem of said valve, and a suspension-spring connecting said bail with said main tank, substantially as set forth.

Witness my hand this 18th day of July, 1899.

FRANK V. GIFFORD.

Witnesses:
 CARL F. GEYER,
 E. R. DEAN.